(12) United States Patent
Schwager et al.

(10) Patent No.: US 9,778,701 B2
(45) Date of Patent: Oct. 3, 2017

(54) SUSPENDED HARD DISK DRIVE SYSTEM FOR PORTABLE COMPUTERS

(75) Inventors: Mark A. Schwager, Cedar Park, TX (US); Michael T. Miller, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 755 days.

(21) Appl. No.: 13/280,916

(22) Filed: Oct. 25, 2011

(65) Prior Publication Data

US 2013/0100604 A1 Apr. 25, 2013

(51) Int. Cl.
*G06F 1/16* (2006.01)
*G06F 1/18* (2006.01)

(52) U.S. Cl.
CPC ............ *G06F 1/1658* (2013.01); *G06F 1/187* (2013.01)

(58) Field of Classification Search
None
See application file for complete search history.

(56) References Cited

U.S. PATENT DOCUMENTS

| | | | | |
|---|---|---|---|---|
| 4,937,806 A * | 6/1990 | Babson et al. | ................ | 720/651 |
| 5,515,237 A * | 5/1996 | Ogami et al. | ............ | 361/679.37 |
| 5,586,003 A * | 12/1996 | Schmitt et al. | .......... | 361/679.58 |
| 5,654,873 A * | 8/1997 | Smithson et al. | ........ | 361/679.37 |
| 5,668,696 A * | 9/1997 | Schmitt | ...................... | 361/679.31 |
| 5,765,933 A * | 6/1998 | Paul et al. | ................. | 312/332.1 |
| 5,790,373 A * | 8/1998 | Kim et al. | ............... | 361/679.31 |
| 5,793,614 A * | 8/1998 | Tollbom | ........................ | 361/732 |
| 5,921,644 A * | 7/1999 | Brunel et al. | .............. | 312/223.2 |
| 6,069,789 A * | 5/2000 | Jung | ......................... | 361/679.32 |
| 6,193,532 B1 * | 2/2001 | Smithson | ...................... | 439/157 |
| 6,222,736 B1 * | 4/2001 | Sim et al. | ..................... | 361/727 |
| 6,616,106 B1 * | 9/2003 | Dean et al. | ................... | 248/27.1 |
| 6,637,719 B2 * | 10/2003 | Jiang | ............................. | 248/682 |
| 6,836,406 B2 * | 12/2004 | Weng et al. | ............. | 361/679.38 |
| 6,957,351 B2 * | 10/2005 | Emberty et al. | .............. | 713/300 |
| 7,639,492 B2 * | 12/2009 | Thomas et al. | .......... | 361/679.37 |
| 7,701,707 B2 * | 4/2010 | Peng et al. | ............... | 361/679.37 |
| 7,813,117 B2 * | 10/2010 | Olesiewicz et al. | ..... | 361/679.34 |
| 2002/0089821 A1 * | 7/2002 | Weng et al. | .................. | 361/685 |
| 2008/0112125 A1 | 5/2008 | Martin et al. | ................. | 361/685 |

* cited by examiner

Primary Examiner — Xanthia C Cunningham
(74) Attorney, Agent, or Firm — Baker Botts L.L.P.

(57) ABSTRACT

An information handling system is disclosed. The information handling system may include a chassis and a storage resource assembly. The storage resource assembly may include a bezel coupled to the chassis by a first connector, the bezel configured to couple to a storage resource by a second connector and a shock isolation cap configured to couple to the storage resource, the shock isolation cap comprising a proximal end proximate to the bezel and a distal end opposite the proximal end.

18 Claims, 3 Drawing Sheets

SUSPENDED HARD DISK DRIVE SYSTEM FOR PORTABLE COMPUTERS

TECHNICAL FIELD

The present disclosure relates in general to information handling systems, and more particularly to a suspended hard disk drive system for portable computers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

In addition, information handling systems may include a variety of hardware and/or software components that may be configured to process, store, and/or communicate information and may include one or more computer systems, data storage systems, and/or networking systems. In order to process, store and manage the information, a hard disk drive may be included in the information handling system. As information handling systems become more compact and complex, various issues have occurred.

During normal use of certain types of information handling systems (e.g., a laptop computer), the system may be subjected to shocks such as movement, dropping, and proximity to noise. These environmental conditions may contribute to early failure or corruption of the hard disk drive (HDD).

In addition, many information handling systems may be capable of running multi-media applications for music, movies, video conferencing and more. As the audio requirements of the system have increased, the hard disk drive (HDD) may be subjected to speaker-emitted vibration that affects HDD performance and can increase degradation that may lead to early failure of the HDD.

Furthermore, as speeds at which the hard drive operates increases, the vibrations may be uncomfortable to the user of the information handling system.

Accordingly, a need has arisen for suspended hard disk drive systems in information handling systems.

SUMMARY

In accordance with the teachings of the present disclosure, disadvantages and problems associated with hard disk drive systems may be substantially reduced or eliminated. An information handling system is disclosed. The information handling system may include a chassis and a storage resource assembly. The storage resource assembly may include a bezel coupled to the chassis by a first connector, the bezel configured to couple to a storage resource by a second connector and a shock isolation cap configured to couple to the storage resource, the shock isolation cap comprising a proximal end proximate to the bezel and a distal end opposite the proximal end.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
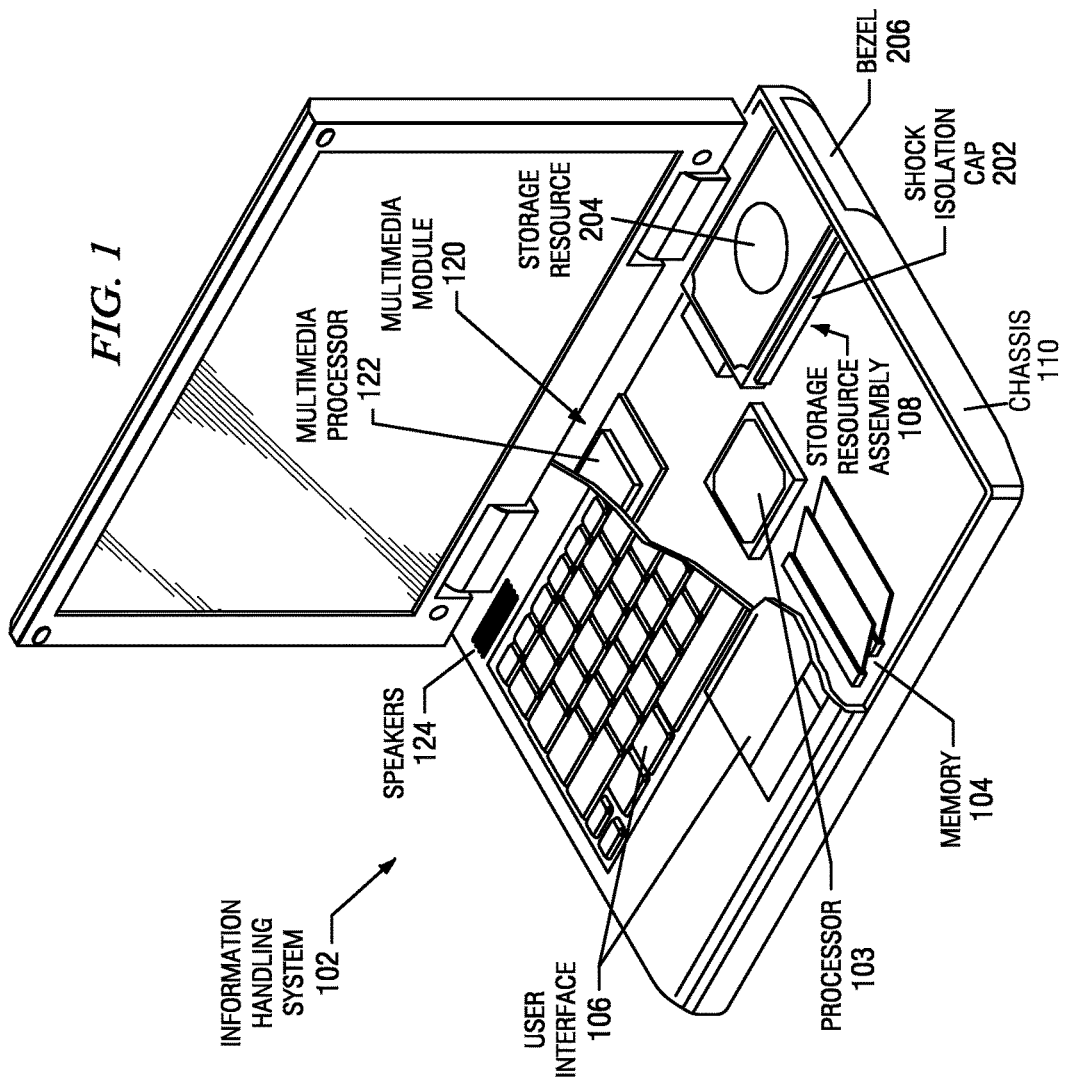
FIG. 1 illustrates a block diagram of an example information handling system, in accordance with embodiments of the present disclosure.

FIG. 1 illustrates a block diagram of an example information handling systems 102. Information handling system 102 may generally be operable to receive data from, and/or transmit data to, other information handling systems 102. In one embodiment, information handling system 102 may be a personal computer adapted for home use. In the same or alternative embodiments, information handling system 102 may be a personal computer adapted for business use. In the same or alternative embodiments, information handling system 102 may be a storage array configured to include multiple storage resources (e.g., hard drives) in order to manage large amounts of data. As shown in FIG. 1, information handling system 102 may include a processor 103, a memory 104 communicatively coupled to processor 103, a user interface 106, and a Storage resource assembly 108.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, Storage resource assembly 108, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Storage resource assembly 108 may include one or more storage resources 204 communicatively coupled to processor 103 and/or memory 104 and may include any system, device, or apparatus operable to retain program instructions or data for a period of time (e.g., computer-readable media) and that retains data after power to information handling system 102 is turned off. Storage resource 204 may include one or more hard disk drives, magnetic tape libraries, optical disk drives, magneto-optical disk drives, compact disk drives, compact disk arrays, disk array controllers, and/or any computer-readable medium operable to store data.

Multimedia module 120 may include a multimedia processor 122 coupled to speakers 124. Multimedia module 120 may be operable to configure information handling system 102 to play videos, games, and/or other similar applications. Speakers 122 coupled to multimedia processor 122 may be configured to play the audio of the videos and/or music. Multimedia processor 122 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, multimedia processor 122 may interpret and/or execute program instructions and/or process data stored in memory 104, storage resource 108, and/or another component of information handling system 102.

In some embodiments, information handling system 102 may be subject to multiple types and sources of shock and/or vibration. These sources may include speakers 124, Storage resource assembly 108, processor 103, multimedia processor 122, and/or other components of information handling system 102. These sources may give rise to speaker emitted vibration, operational vibration, palmrest vibration and/or other types of shock and/or vibration that may negatively impact the life and/or performance of components such as Storage resource assembly 108. This shock and/or vibration may also negatively impact the user of information handling system 102. For example, operational vibration and speaker-emitted vibration may lead to an increase in field failure rates of storage resource 204 and/or other components of information handling system 102.

Referring again to FIG. 1, storage resource assembly 108 may also include one or more shock insulation cap(s) 202 and bezel 206, as described in more detail below with reference to FIGS. 2-4.

Although FIG. 1 depicts information handling systems 102 with certain features or devices, any suitable number and/or type of devices may be included in information handling system 102. In addition, although, storage resource assembly 108 is depicted in a certain location, information handling system 102, may be configured in any suitable manner.

Figure 2:
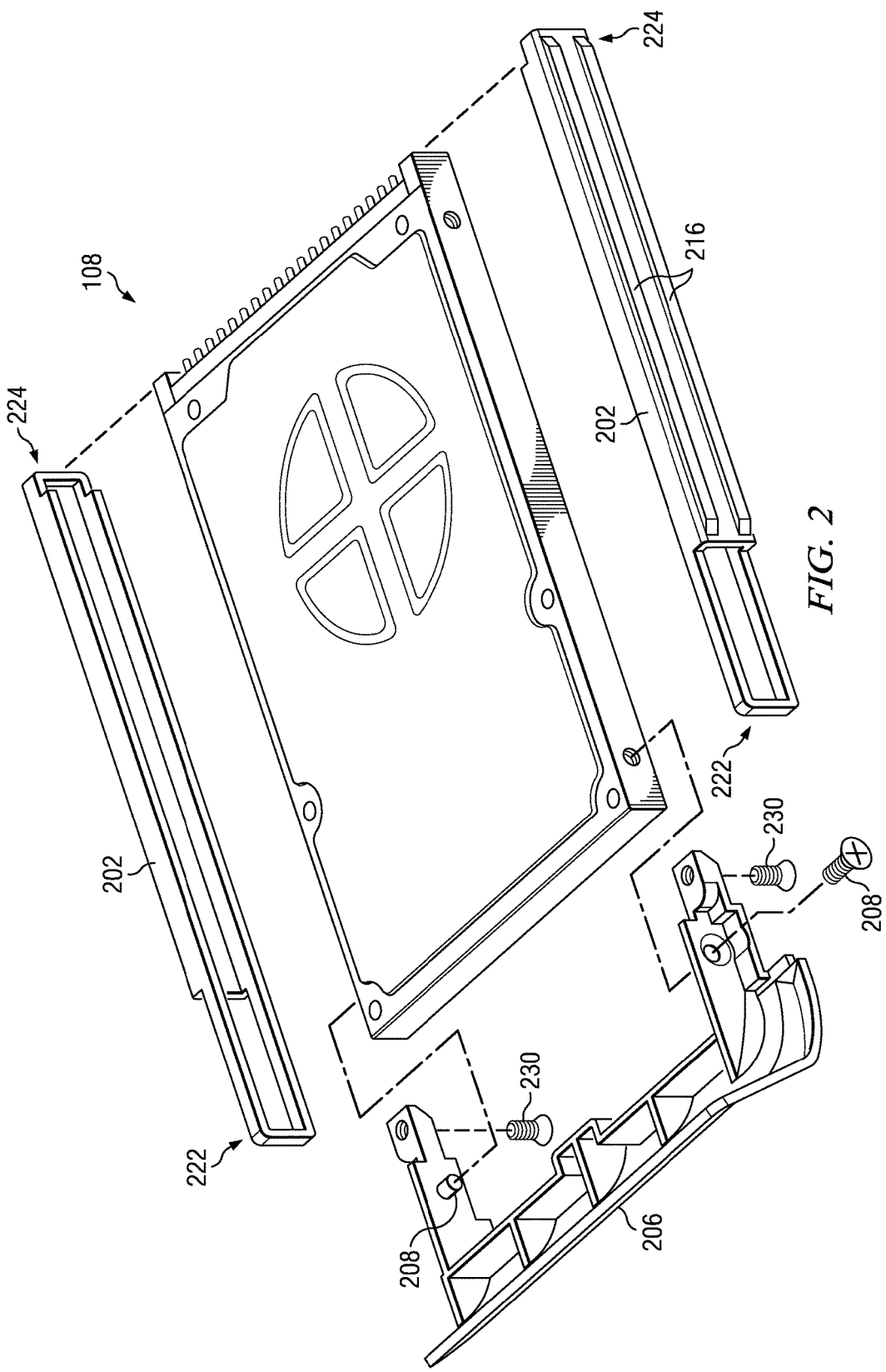
FIG. 2 illustrates an example diagram of the components of a storage resource assembly of information handling system, in accordance with certain embodiments of the present disclosure.

FIG. 2 illustrates an example diagram of the components of a storage resource assembly 108 of information handling system 102, in accordance with certain embodiments of the present disclosure. As described above with reference to FIG. 1, information handling system 102 may include storage resource assembly 108. In some embodiments storage resource assembly 108 may include storage resource 204, bezel 206, and/or one or more shock isolation caps 202. Storage resource assembly 108 may be configured to fit into a cavity of information handling system 102 such that storage resource 204 is not visible to the user.

In some embodiments, storage resource 204 may be a non-volatile, high capacity computer-readable media operable to store digital data. As an illustrative example, storage resource 204 may be a 320 GB, 500 GB or 640 GB hard disk drive. In some embodiments, storage resource 204 may comprise a 7 mm- or 9.5 mm-high case that fits within the profile of information handling system 102. In other embodiments, storage resource 204 may be larger or smaller, and/or may have lesser or greater capacity than the illustrative example provided.

In some embodiments, the mechanical operation of storage resource 204 may create vibration that may be felt through chassis 110 of information handling system 102, as shown in FIG. 1. This vibration may be referred to as "palmrest vibration". It may be necessary or desirable to reduce or eliminate such vibration to improve the performance of information handling system 102. Further, the mechanical operation of storage resource 204 may create vibration that may adversely affect continued operation of storage resource 204. This vibration may lead to increased field failure rates of storage resource 204. Still further, certain types of operational vibration and/or shock (e.g., from external environmental factors such as dropping information handling system 102, or vibration from external factors such as airplane or train vibration) to some or all of information handling system 102 while storage resource 204 is in operation may lead to increased field failure rates of storage resource 204.

Referring again to FIG. 2, in some embodiments, bezel 206 may be configured such that it may be flush with an outer plane of chassis 110 of information handling system 102 when storage resource assembly 108 is inserted into information handling system 102.

In some embodiments, one or more fasteners 208 may be configured to couple bezel 206 to storage resource 204. Additionally, one or more fasteners 230 may be configured to couple bezel 206 to chassis 110 of information handling system 102. In some configuration, bezel 206 may therefore be configured to pivot relative to storage resource 204 while coupled to information handling system 102. The coupling of bezel 206 to information handling system 102 may allow bezel 206 to absorb certain types of shock and/or vibration without passing that shock and/or vibration to storage resource 204 or the rest of information handling system 102. In some embodiments, bezel 206 may also be configured to maintain the position of shock absorption caps 202, as described in more detail below. In some embodiments, fasteners 208, 230 may be configured as a screw. In alternate embodiments, fasteners 208. 230 may be configured as a peg, bolt, and/or any suitable fastener configured to couple bezel 206 to storage resource 204 or information handling system 102.

As described in more detail above with reference to FIG. 1, when storage resource assembly 108 is coupled to information handling system 102, storage resource assembly 108 may be subjected to vibration through normal use of information handling system 102 ("operational vibration") or through the use of multi-media applications and components such as speakers 124 ("speaker-emitted vibration"). This vibration or shock may harm the life and/or operation of storage resource 204 and/or other components of information handling system 102. In some embodiments, the addition of one or more shock isolation caps 202 may reduce the shock absorbed by information handling system 102 and/or storage resource 204. Shock isolation caps 202 may comprise any material suitable to absorb shock and/or minimize passing the shock and/or vibration to other components of information handling system 102. As an illustrative example, shock isolation caps 202 may comprise Exxon Bromobutyl 2244. In some configurations, the material may be selected to conform to certain requirements (e.g., hardness and flammability) to meet specifications required by information handling system 102 such as the size and shape of the cavity required by Storage resource assembly 108.

In some embodiments shock isolation caps 202 may have dimensions such that shock isolation caps 202 maintain their place on storage resource 204 through an interference fit. An interference fit may maintain coupling of two components via friction or compression rather than a third component such as a screw.

In the same or alternative embodiments, shock isolation caps 202 may be configured such that they may be utilized on legacy storage resource assemblies without affecting insertion into legacy information handling systems.

In some embodiments, shock absorption cap 202 may include loop 222. Loop 222 may be formed to fit around one end of storage resource 204 proximal to bezel 206. In some configurations loop 222 may be formed to couple to storage resource 204 210 without interfering with the pivot point of bezel 206 around fastener 208. In such a configuration, bezel 206 may be configured to maintain the position of shock isolation caps 202 relative to storage resource 204. In some embodiments, the fit may be such that the height of shock isolation caps 202 matches the height of storage resource 204. In addition, the fit may be an interference fit.

In some embodiments, shock absorption cap 202 may include end cap 224 at an end opposite bezel 206. In some embodiments, end cap 224 may be formed to fit around storage resource 204 without interfering with insertion of storage resource assembly 108 into information handling system 102. In the same or alternative embodiments, end cap 224 of shock isolation caps 202 may be formed as a lead-in chamfer to facilitate blind insertion into information handling system 102.

In some embodiments, shock isolation caps 202 may also include one or more ribs 216 on the side of shock isolation cap between shock isolation cap 202 and information handling system 102. Ribs 216 may be raised portions of shock isolation caps 202 and may be made of the same or different material as shock isolation caps 202. Ribs 216 may offer less friction during assembly and/or disassembly of storage resource assembly 108 in information handling system 102. In addition, ribs 216 may provide a more balanced shock dissipation profile for storage resource assembly 200.

Although FIG. 2 discloses a particular number of components with respect to hard disk drive Storage resource assembly 108, it may be understood by one of ordinary skill in the art that storage resource assembly 108 may have greater or fewer components than those depicted in FIG. 2. In addition, although FIG. 2 discloses a certain type of storage resource 204 in storage resource assembly 108, the types (e.g., capacity, case height) of storage resource 204 in storage resource assembly 108 may be of any suitable type.

Figure 3:
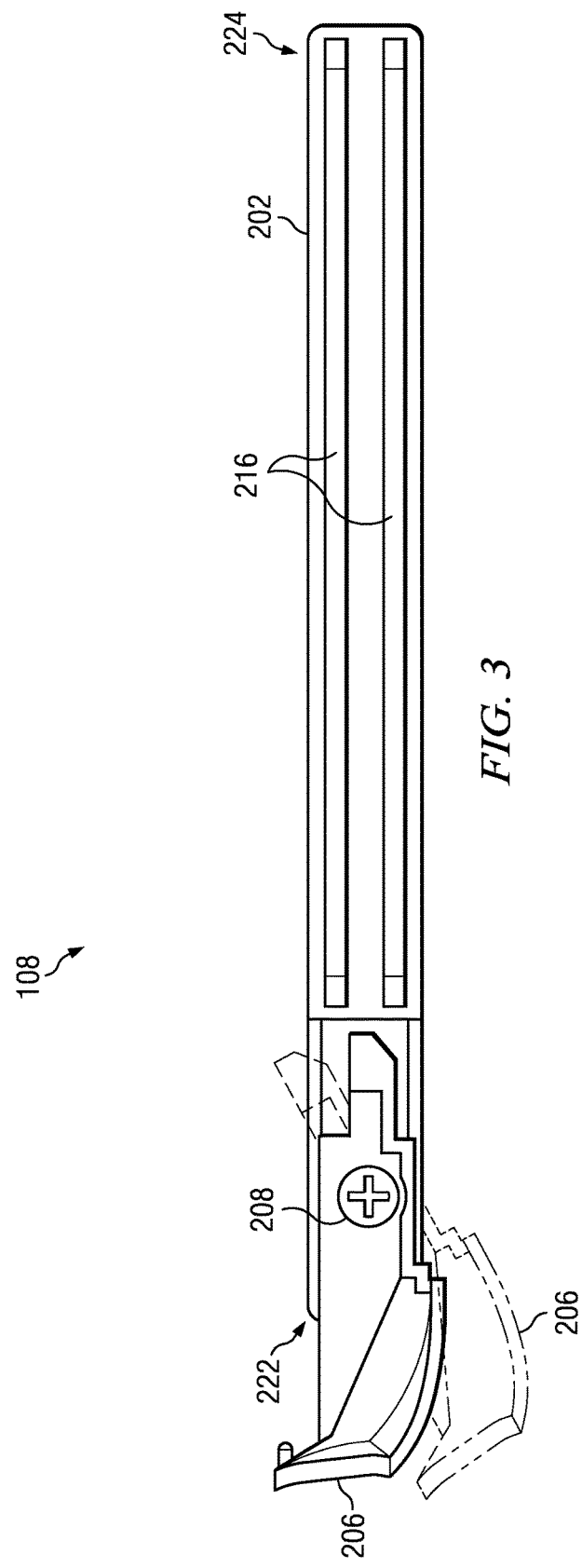
FIG. 3 illustrates an example diagram of an assembled storage resource assembly 108 in information handling system 102, in accordance with certain embodiments of the present disclosure.

FIG. 3 illustrates an example diagram of an assembled storage resource assembly 108 in information handling system 102, in accordance with certain embodiments of the present disclosure.

In some embodiments, bezel 206 may be mounted to storage resource 204 by one or more fasteners 208. Fastener 208, when inserted, may allow storage resource 204 to pivot around the axis from at fastener 208. When inserted in an information handling system bezel 206 may be flush with the case and cause the remaining components of storage resource assembly 308 to not be visible to the user. In addition, the flexibility of bezel 206 may allow shock isolation caps 202 to absorb shock from storage resource 204.

Shock isolation caps 202 may fit around storage resource 204. Shock isolation caps 202 may absorb the sources of vibration (e.g., speakers, HDD operation and general use shock) by isolating the frame from the information handling system. In addition, shock isolation caps 202 may be formed around legacy HDD assemblies without interfering with the insertion of Storage resource assembly 108 into an information handling system.

Although the present disclosure has been described in detail, it should be understood that various changes, substitutions, and alterations can be made hereto without departing from the spirit and the scope of the invention as defined by the appended claims.

What is claimed is:

1. An information handling system comprising:
   a chassis;
   a storage resource assembly comprising:
      a bezel coupled to the chassis by a first connector, the bezel coupled to a storage resource by a second connector; and
      a shock isolation cap coupled to the storage resource through an interference fit, the shock isolation cap comprising a proximal end proximate to the bezel and a distal end opposite the proximal end.

2. The information handling system of claim 1 wherein the storage resource is a 7 mm hard disk drive.

3. The information handling system of claim 1 wherein the storage resource is a 9.5 mm hard disk drive.

4. The information handling system of claim 1 wherein the bezel is configured to pivot relative to the storage resource.

5. The information handling system of claim 1 wherein the shock isolation cap comprises a rib situated substantially between the storage resource and the information handling system.

6. The information handling system of claim 1 wherein the shock isolation cap is configured to provide isolation between the storage resource assembly and the information handling system when the storage resource assembly is inserted in the information handling system.

7. The information handling system of claim 1 wherein the proximal end of the shock isolation cap comprises a loop configured to allow the bezel to couple to the chassis through the shock isolation cap.

8. The information handling system of claim 1 wherein the proximal end of the shock isolation cap is configured to allow the bezel to pivot about the axis formed by the second connector.

9. The information handling system of claim 1 wherein the distal end of the shock isolation caps comprise a lead-in chamfer.

10. A storage resource assembly comprising:
    a bezel coupled to a chassis of an information handling system by a first connector, the bezel coupled to a storage resource by a second connector; and
    a shock isolation cap coupled to the storage resource through an interference fit, the shock isolation cap comprising a proximal end proximate to the bezel and a distal end opposite the proximal end.

11. The storage resource assembly of claim 10 wherein the storage resource is a 7 mm hard disk drive.

12. The storage resource assembly of claim 10 wherein the storage resource is a 9.5 mm hard disk drive.

13. The storage resource assembly of claim 10 wherein the bezel is configured to pivot relative to the storage resource.

14. The storage resource assembly of claim 10 wherein the shock isolation cap comprises a rib situated substantially between the storage resource and the information handling system.

15. The storage resource assembly of claim 10 wherein the shock isolation cap is configured to provide isolation between the storage resource assembly and the information handling system when the storage resource assembly is inserted in the information handling system.

16. The storage resource assembly of claim 10 wherein the proximal end of the shock isolation cap comprises a loop configured to allow the bezel to couple to the chassis through the shock isolation cap.

17. The storage resource assembly of claim 10 wherein the proximal end of the shock isolation cap is configured to allow the bezel to pivot about the axis formed by the second connector.

18. The storage resource assembly of claim 10 wherein the distal end of the shock isolation caps comprise a lead-in chamfer.

* * * * *